United States Patent
Awni

(10) Patent No.: US 9,971,932 B2
(45) Date of Patent: May 15, 2018

(54) CRYPTOGRAPHIC KEY VISUALIZATION

(71) Applicant: Joseph David Awni, Sandy Spring, MD (US)

(72) Inventor: Joseph David Awni, Sandy Spring, MD (US)

(*) Notice: Subject to any disclaimer, the term of this patent is extended or adjusted under 35 U.S.C. 154(b) by 45 days.

(21) Appl. No.: 14/837,652

(22) Filed: Aug. 27, 2015

(65) Prior Publication Data

US 2017/0061199 A1    Mar. 2, 2017

(51) Int. Cl.
  *G06K 9/00* (2006.01)
  *H04L 29/06* (2006.01)

(52) U.S. Cl.
  CPC ...... *G06K 9/00288* (2013.01); *H04L 63/0861* (2013.01); *H04L 63/0272* (2013.01); *H04L 63/0428* (2013.01); *H04L 63/168* (2013.01)

(58) Field of Classification Search
  CPC ............ G06K 9/00288; H04L 63/0428; H04L 63/0861; H04L 63/1433; G06Q 20/3829
  USPC .... 705/67, 75; 713/161, 168, 182, 186, 189; 380/44, 277; 709/204, 227, 228
  See application file for complete search history.

(56) References Cited

U.S. PATENT DOCUMENTS

| | | | |
|---|---|---|---|
| 2002/0023216 A1* | 2/2002 | Noguchi | H04L 9/32 713/171 |
| 2003/0103652 A1* | 6/2003 | Lee | G06K 9/00288 382/118 |
| 2007/0088953 A1* | 4/2007 | Hilton | G07D 7/0026 713/176 |
| 2010/0017602 A1* | 1/2010 | Bussard | H04L 9/0844 713/168 |
| 2013/0036458 A1* | 2/2013 | Liberman | H04L 9/3231 726/6 |
| 2013/0121584 A1* | 5/2013 | Bourdev | G06K 9/00281 382/190 |
| 2016/0071101 A1* | 3/2016 | Winarski | G06Q 20/3829 705/71 |
| 2016/0224983 A1* | 8/2016 | Cash | G06Q 20/40145 |

OTHER PUBLICATIONS

A. Perrig et al, Hash Visualization: a New Technique to improve Real-World Security, Oct. 1999.*

* cited by examiner

Primary Examiner — Shanto M Abedin

(57) ABSTRACT

This invention regards a method of key-fingerprint visualization that is unique, reproducible, and nearly impossible to forge which aims to improve the usability of crypto-systems by creating a visual representation of the key-fingerprint as a face. First, the cryptographic identification (either PKI or fingerprint) is converted into a standardized format. Then, the standardized cryptographic identification information is segmented into smaller parts. Each of the parts is pragmatically translated to facial features. Thus, an image of a face is produced from the original cryptographic identification information.

1 Claim, 1 Drawing Sheet

Image A

Image B

Image A
Image B
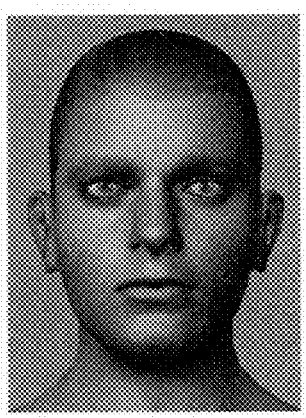
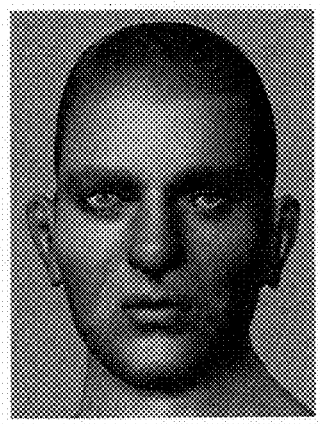

CRYPTOGRAPHIC KEY VISUALIZATION

CROSS-REFERENCE TO RELATED APPLICATIONS

Not Applicable

STATEMENT REGARDING FEDERALLY SPONSORED RESEARCH OR DEVELOPMENT

Original research was funded under DARPA-PA-11-52—Cyber Fast Track (CFT).

All rights remain with Joseph D. Awni

BACKGROUND OF THE INVENTION

Although widely used, electronic crypto-systems' complexity are, in a sense, their biggest weakness. In that sense, users' lack of understanding of cryptographic fundamentals represents the weakest-link in the security of electronic messages systems that use highly sophisticated encryption algorithms. This invention improves the cryptographic processes of identification and authentication by simplifying them; making cryptographic identification as natural to the user as recognizing the face of a speaker. By representing cryptographic identification information as a face, authenticating the source of an electronic message can be done in a way that emulates the centuries-old method of visually recognizing the person to whom you are speaking.

In the context of cryptographic electronic messaging, asymmetric cryptographic messaging systems, such as Secure Sockets Layer (SSL) [IETF RCF 6101], enable encrypted channels to be set up on-the-fly; without prior agreement on neither cipher nor key. Thus, the fundamental problem faced by users of contemporary electronic messaging applications is reliable and accurate identification of the source of communication. Cryptographically, it is possible to accurately and reliably identify the source of electronic messages, but the perceived complexity/tedium of fulfilling this operation limits it's use. Thus, certain aspects of crypto-systems are effectively considered too complicated for non-specialists, and therefore under-used or unused by "end-users" due to perceived complexity.

The two cryptographic tools known to address the issues of identification and authentication of a remote party are Public Key Infrastructure (PKI) and key-fingerprints. Contemporary users of crypto-systems are asked to compare cryptographic hashes in a machine-readable format to verify the identity of remote parties.

In the context of PGP/GPG email and Secure Shell (SSH), identity verification is done by comparing two strings in hexadecimal notation. In WWW browsers, key verification is transparent to the user; a PKI "chain-of-trust" is used to validate the identity of the remote site. This has proven problematic as third-party Certificate Authorities (CAs) are known to have issued keys arbitrarily. To address the issue of key verification in the browser, new systems such as Domain Name System Security Extensions (DNSSEC) and the Electronic Frontier Foundation's Secure Sockets Layer (SSL) Observatory have been developed and deployed.

BRIEF SUMMARY OF THE INVENTION

The goal of this invention is to improve electronic messaging security by reformatting cryptographic information in a way that leverages the human brain's natural abilities. This invention addresses the difficulties faced using complex tools of crypto-systems by providing cryptographically generated visual cues designed to be memorable, and natural for end-users.

Rather than ask users to compare cryptographic hashes in a machine-readable format, information is represented as a graphical image of a face. The advantage of this method over existing methods is that it improves usability of cryptographically secure communication systems by leveraging the brain's natural ability to recognize visual patterns and faces. Thereby simplifying users interaction with seemingly complicated cryptographic functions by emulating the processes used in oral communication for identifying a speaker; recognizing his/her face.

BRIEF DESCRIPTION OF THE SEVERAL VIEWS OF THE DRAWING

FIG. 1: Image A and Image B demonstrate how much quicker visual key-fingerprint representations can convey information. Face images were generated from the following similar looking key-fingerprints: (43:51:43:a1:b5:fc:8b:b7:0a:3a:a9:b1:0f:66:73:a8) Image A. (43:51:43:a1:b5:fc:8b:b7:0a:3a:a9:b1:0f:68:73:a8) Image B. The resulting images are more readily recognized as different than the strings of hexadecimal.

DETAILED DESCRIPTION OF THE INVENTION

By far, the most common use of cryptographic identity technologies is on the World Wide Web (WWW) in the form of "https" encrypted web-pages. In this case, PKI is used to identify and authenticate remote web-sites. A less common use of cryptographic identity technology, and the best contemplated mode of use of this invention is Secure Shell (SSH). Because SSH uses key-fingerprints, not PKI to positively identify remote hosts, users are prompted to confirm the key-fingerprint of the remote host by comparing it to a known value like so:

```
[test@localhost ~]$ ssh 127.0.0.1
The authenticity of host "127.0.0.1 (127.0.0.1)" can't be established.
ECDSA key fingerprint is "eb:56:03:37:0d:9d:62:65:9b:15:fb:78:0c:8d:65:e8".
Are you sure you want to continue connecting (yes/no)?
```

Presently, users of SSH are required to manually compare the remote host's key-fingerprint in hexadecimal format to a known value. However, this step is often overlooked or hastily done. A difference of one character in the key-fingerprint means the other party is misrepresenting itself. For example, when using SSH would you spot the difference between:

"eb:56:03:37:0d:9d:62:65:9b:15:fb:78:0c:8d:65:e8" and
"eb:56:03:37:0d:9d:62:65:9d:15:fb:78:0c:8d:65:e8"?

For key-fingerprint users, the problem is obvious: representing this information in hexadecimal format is not optimal for the purposes of readability or recognition.

A method to visualize cryptographic identification information as an image of a face is the subject of this patent application. In the case of SSH, the process of comparing key-fingerprints would be improved by representing key information graphically, rather than text-based-format. Images of faces would be generated from the key-fingerprint's data like so: Key-fingerprint data would be transformed and serialized so that small changes to the key-fingerprint's data result in very noticeable changes in the corresponding visualization. Key-fingerprint data would be divided and used to fill values of facial parameters in a repeatable and unique way. Then, parameters are passed to a face visualization library to generate an image. (note: For further detail, a programmatic instruction set is listed in the first section of the Specification Document)

This makes the process of key verification faster, more reliable, and natural to the user. Instead of asking the user to compare hexadecimal strings, the key-fingerprint is visualized in a way that takes advantage of the brain's natural ability to recognize faces.

Thus, fulfilling the requirement of key-fingerprint verification and or PKI can be as simple as asking the user, "Do these faces match?"

See FIG. 1: Two faces (Images A and B) made from similar key fingerprints

Specifically, new in this invention is an improved method of display of key-fingerprint data. Key-fingerprint data is to be shown graphically in a way that takes advantage of natural abilities to recognize visual patterns and faces.

The invention claimed is:

1. A method to cryptographically identify and authenticate remote parties in microprocessor based message systems capable of graphic display with visual representations of cryptographic information, the method comprising:

creating, by the microprocessor based message system, a unique and reproducible cryptographically secure representation of key-fingerprint data by performing:
  producing a hash of the original key-fingerprint of any format to a standardized format of fixed length to obtain serialize-able visualization data;
  splitting the visualization data into an array of as many fields as there are facial visualization parameters,
  setting values for each of the facial parameters,
  passing the facial parameters to a face visualization library, and
  generating, using the facial parameters in the face visualization library, a visual representation of cryptographic identification information as a graphical image of a face thru a programmatic translation of standardized cryptographic identification to facial features or other graphical cues that uniquely replicate to the user face;
displaying, by the microprocessor based message system, the visual representations of cryptographic identification information as the graphical image a face, and
identifying and authenticating remote parties, by the microprocessor based message system, using the unique and reproducible cryptographically secure representation of key-fingerprint data.

* * * * *